US008308209B1

(12) United States Patent
Bibow et al.

(10) Patent No.: US 8,308,209 B1
(45) Date of Patent: Nov. 13, 2012

(54) AIR CONDITIONING FILTER REPLACEMENT SYSTEM

(76) Inventors: Christopher W. Bibow, Huntington, NY (US); Richard Valley, Ridgewood, NY (US)

( * ) Notice: Subject to any disclaimer, the term of this patent is extended or adjusted under 35 U.S.C. 154(b) by 375 days.

(21) Appl. No.: 12/660,409

(22) Filed: Mar. 1, 2010

(51) Int. Cl.
*B25J 1/00* (2006.01)
*B25G 1/04* (2006.01)

(52) U.S. Cl. .............. 294/61; 294/24; 294/26; 294/175; 294/182; 55/481; 55/506

(58) Field of Classification Search .................... 55/481, 55/483, 506; 294/15, 19.3, 24, 26, 175, 210, 294/61, 182
See application file for complete search history.

(56) References Cited

U.S. PATENT DOCUMENTS

| | | | | |
|---|---|---|---|---|
| 1,686,889 | A * | 10/1928 | Woods | 294/26 |
| 4,004,539 | A * | 1/1977 | Wesson | 114/221 R |
| 4,574,512 | A * | 3/1986 | Hahn | 43/5 |
| 4,881,338 | A * | 11/1989 | Lung | 43/5 |
| 5,003,437 | A * | 3/1991 | Barrett | 362/109 |
| 5,273,329 | A * | 12/1993 | Wessel | 294/61 |
| 5,487,576 | A * | 1/1996 | DuVivier | 294/210 |
| 5,601,322 | A * | 2/1997 | Forest | 294/3 |
| 5,665,145 | A * | 9/1997 | Goodman et al. | 95/273 |
| 5,788,608 | A * | 8/1998 | Wilkinson | 482/51 |
| 5,913,671 | A * | 6/1999 | Fernandez et al. | 43/18.1 R |
| 7,066,511 | B2 * | 6/2006 | Newman et al. | 294/210 |
| 8,075,031 | B2 * | 12/2011 | Walker, Jr. | 294/24 |
| 2004/0100109 | A1 * | 5/2004 | Johnson | 294/26 |
| 2011/0018290 | A1 * | 1/2011 | Jones et al. | 294/19.3 |

* cited by examiner

*Primary Examiner* — Robert Clemente
(74) *Attorney, Agent, or Firm* — Edward P Dutkiewicz

(57) ABSTRACT

A system comprising a handle having a gripping end and a working end. The system also comprising a filter engagement tool. The filter engagement tool is coupled to the handle. The filter engagement tool has a filter engagement means.

4 Claims, 9 Drawing Sheets

FIG 1
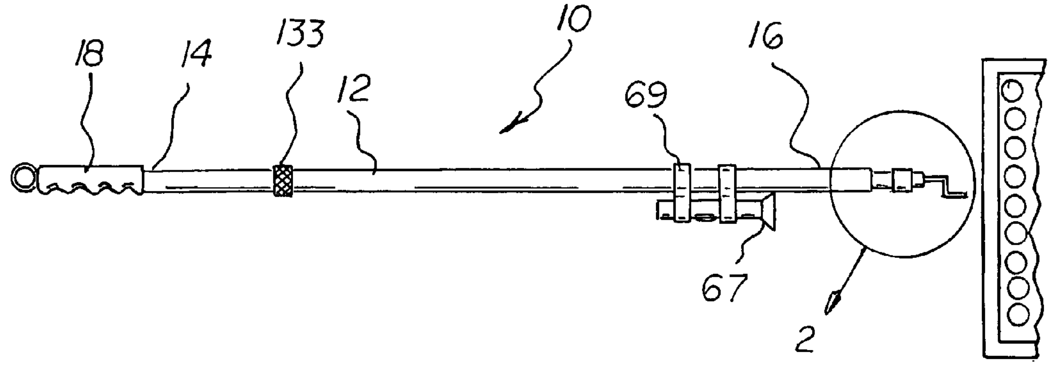
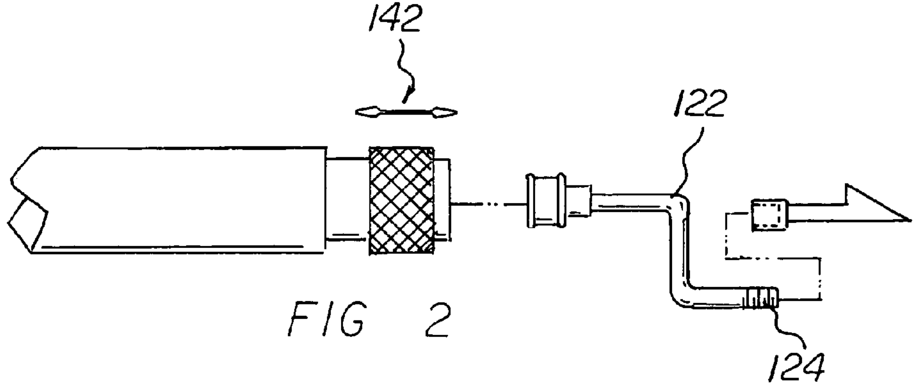
FIG 2
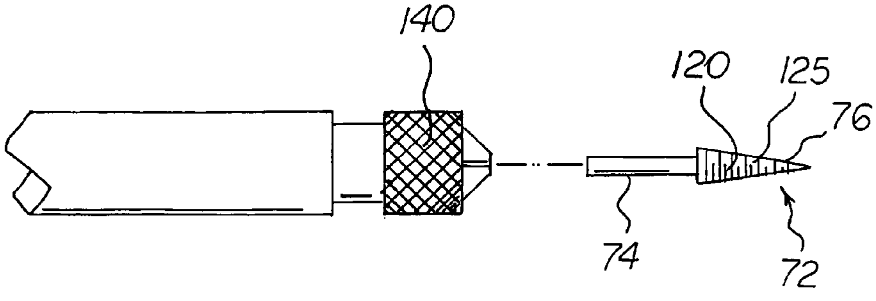
FIG 3

FIG 4
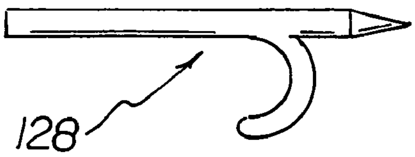
FIG 5
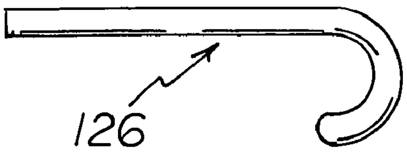
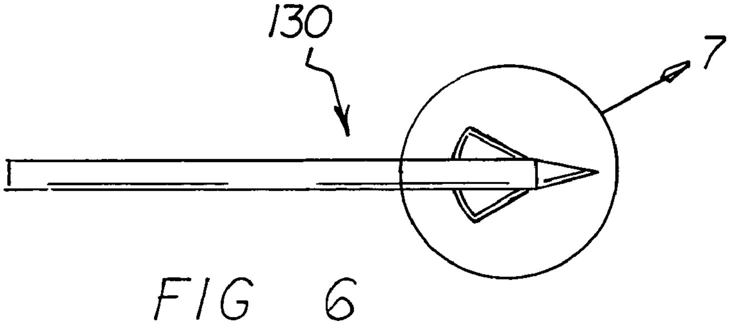
FIG 6
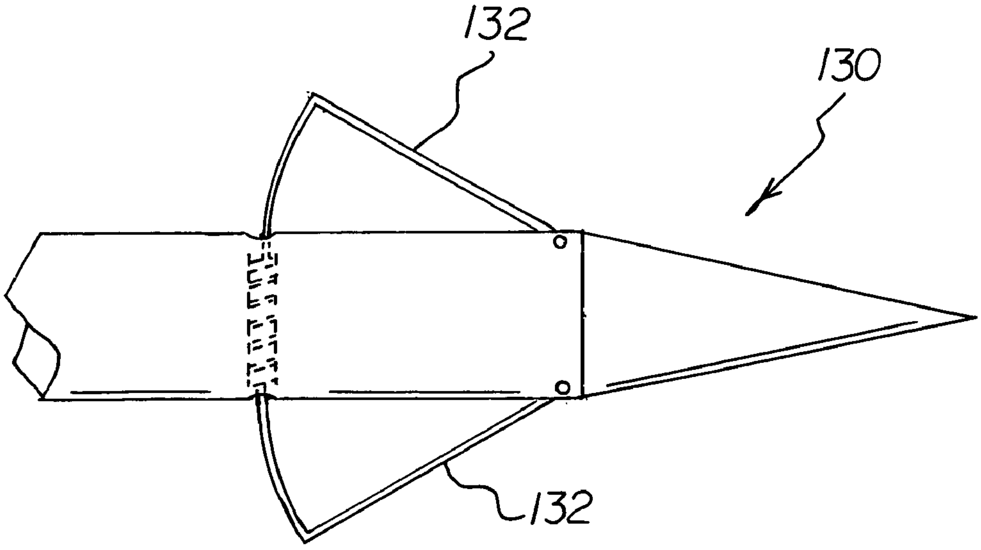
FIG 7

FIG 8
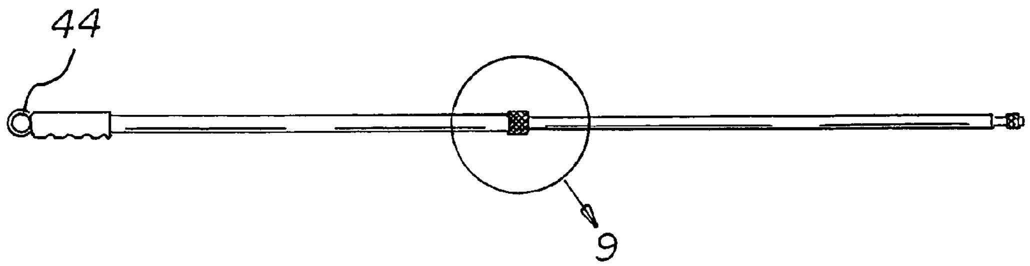
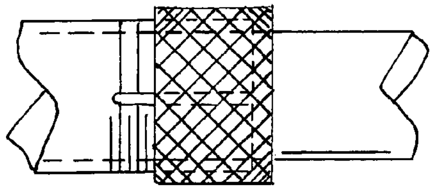
FIG 9
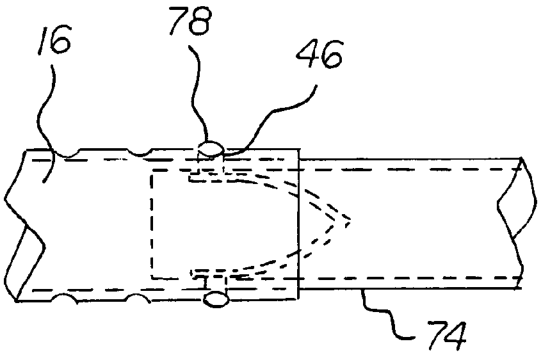
FIG 10
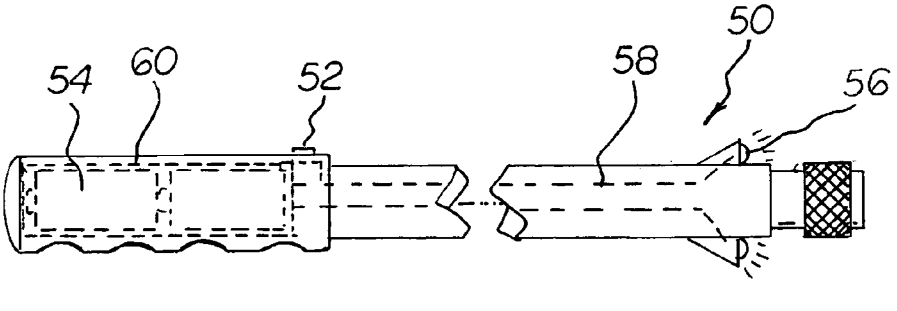
FIG 11

FIG 14
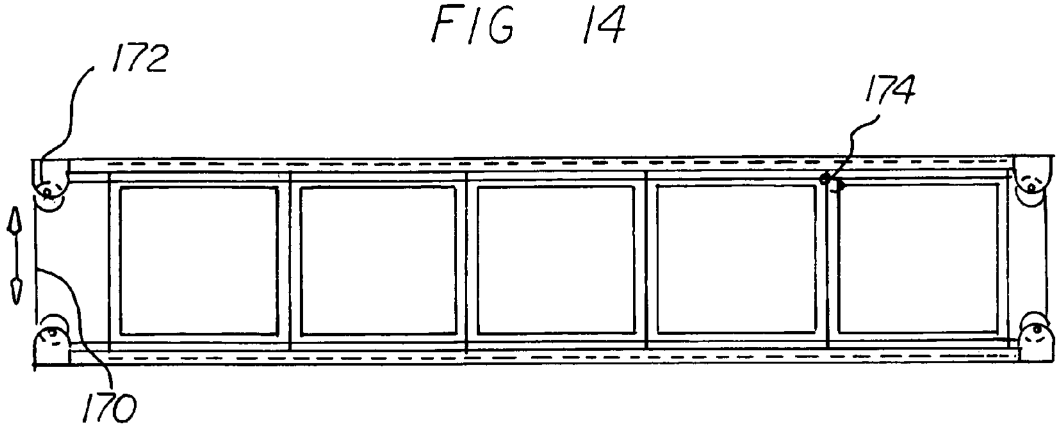
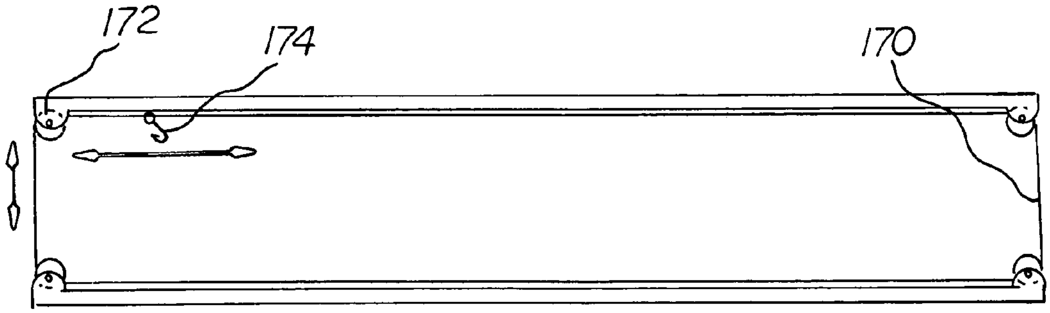
FIG 15

FIG 16
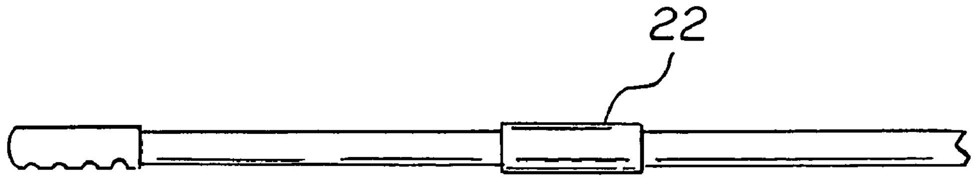
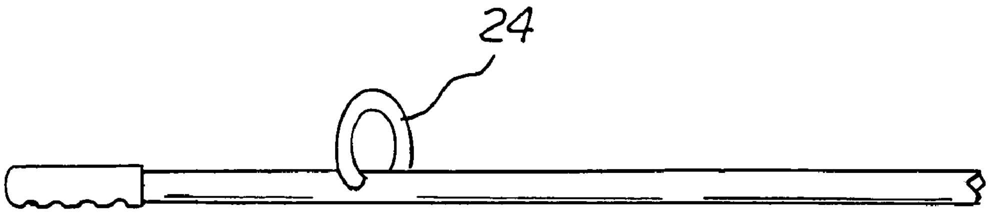
FIG 17

FIG 18
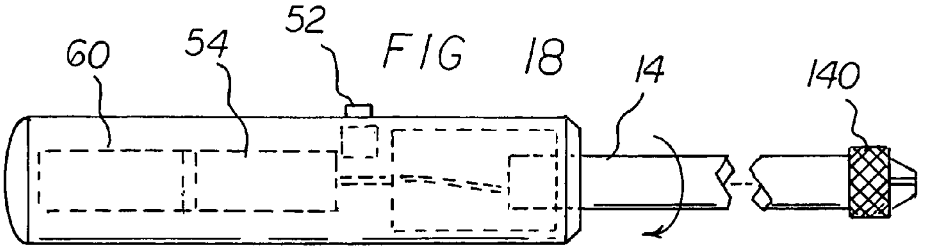
FIG 19
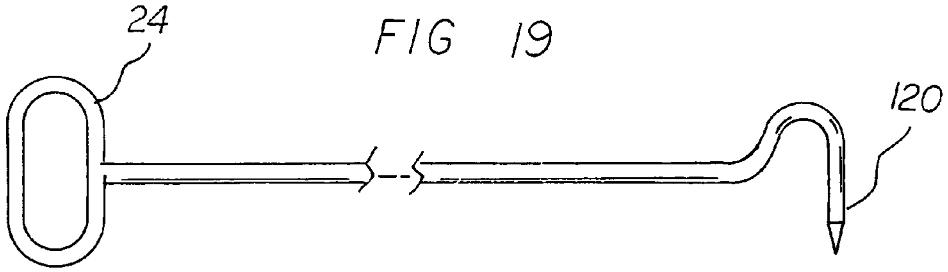
FIG 20
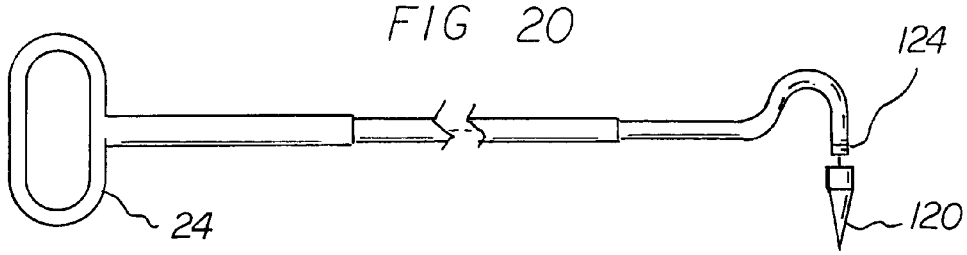
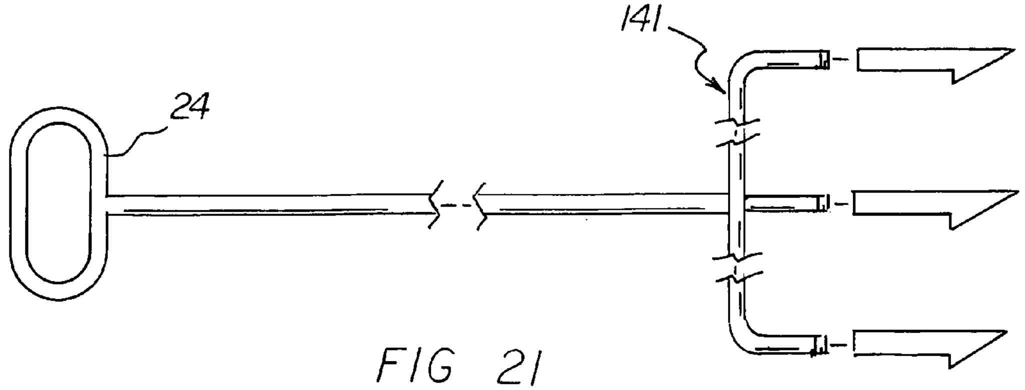
FIG 21

AIR CONDITIONING FILTER REPLACEMENT SYSTEM

BACKGROUND OF THE INVENTION

1. Field of the Invention

The present invention relates to an air conditioning filter replacement system and more particularly pertains to allowing a user to easily replace an air conditioning filter.

2. Description of the Prior Art

The use of systems to replace an air conditioning filter is known in the prior art. More specifically, systems to replace an air conditioning filter previously devised and utilized for the purpose of helping an air conditioning technician to replace an air conditioning filter are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the aforementioned patents do not describe an air conditioning filter replacement system that allows allowing a user to easily replace an air conditioning filter.

In this respect, the an air conditioning filter replacement system according to the present invention substantially departs from the conventional concepts and designs of the prior art, and in doing so provides an apparatus primarily developed for the purpose of allowing a user to easily replace an air conditioning filter.

Therefore, it can be appreciated that there exists a continuing need for a new and improved an air conditioning filter replacement system which can be used for allowing a user to easily replace an air conditioning filter. In this regard, the present invention substantially fulfills this need.

SUMMARY OF THE INVENTION

In view of the foregoing disadvantages inherent in the known types of systems to replace an air conditioning filter now present in the prior art, the present invention provides an improved an air conditioning filter replacement system. As such, the general purpose of the present invention, which will be described subsequently in greater detail, is to provide a new and improved an air conditioning filter replacement system and method which has all the advantages of the prior art and none of the disadvantages.

To attain this, the present invention essentially comprises an air conditioning filter removal system comprising several components, in combination.

First provided is a handle. The handle is fabricated of a rigid dielectric material. The handle is configured to be telescoping in length, so that the handle may be collapsed within itself, to make carrying and storage easier to accomplish. The handle has a hollow tubular configuration of a first, second, third, and fourth internal diameters, and first, second, third, and fourth external diameters. The first internal diameter being larger than the second internal diameter, the second internal diameter being larger than the third internal diameter, and the third internal diameter being larger than the fourth internal diameter.

The first external diameter being the largest. The fourth external diameter is smaller than the third internal diameter so as to allow the storage of the fourth segment within the third internal diameter. The third external diameter is smaller than the second internal diameter so as to allow the storage of the third segment within the second internal diameter. The second external diameter is smaller than the first internal diameter so as to allow the storage of the second segment within the first internal diameter.

The handle has a gripping end and a working end with a telescoping length there between.

The gripping end of the handle also has a hanging loop, which may also serve as a wrist strap. The working end of the handle has a working tip coupling means, such as a slip collar and ball configuration which is well known in the art, a detent and hole configuration, also well known in the art, and a thread with locking pin configuration.

The handle has an illumination component comprising a switch, a battery, a light, and a plurality of wires. The wires electronically couple the switch, the battery, and the light. The light is coupled to the shaft of the handle, adjacent the working end. The lights are directed toward the working end so as to provide illumination at the working end. The battery has an associated battery case. The batter case is located adjacent the gripping end of the handle. The switch is located at the gripping end of the handle.

Lastly provided is a filter engagement tool. The filter engagement tool is fabricated of a rigid dielectric material. The reason a dielectric, insulating, material is used is that it prevents the filter engagement tool from acting as a conductor between an electrical potential, either by conducting a voltage toward the user, or conducting a voltage to some other location, such as exposed metal or another wire. The tool has a handle mounting end and a filter engagement end, with a length there between.

The handle mounting end of the engagement tool is configured with a component of an engagement means, such as those listed above, such as a shaft with groove, to engage the slip collar and ball configuration which is well known in the art, a pair of spring loaded detents so as to engage the detent holes in the working end of the handle, and a threaded shaft with an thread end recess so as to allow the threaded end to engage and be locked in position with the locking pin of the thread with locking pin configuration, described above.

These connecting devices allow the handle mounting end of the filter engagement tool to be coupled with the working end of the handle, and to be held securely in place by said means.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved an air conditioning filter replacement system which has all of the advantages of the prior art systems to replace an air conditioning filter and none of the disadvantages.

It is another object of the present invention to provide a new and improved an air conditioning filter replacement system which may be easily and efficiently manufactured and marketed.

It is further object of the present invention to provide a new and improved an air conditioning filter replacement system which is of durable and reliable constructions.

An even further object of the present invention is to provide a new and improved air conditioning filter replacement system which is susceptible of a low cost of manufacture with regard to both materials and labor, and which accordingly is then susceptible of low prices of sale to the consuming public, thereby making such an air conditioning filter replacement system economically available to the buying public.

Even still another object of the present invention is to provide an air conditioning filter replacement system for allowing a user to easily replace an air conditioning filter.

Lastly, it is an object of the present invention to provide a new and improved air conditioning filter replacement system comprising a handle having a gripping end and a working end. The system also comprises a filter engagement tool. The filter engagement tool is coupled to the handle. The filter engagement tool has a filter engagement means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is side elevational view of the system showing an air filter in relation to the system. A solid handle is demonstrated, but in the preferred embodiment, the handle is telescoping. Note the ratchet device which allows for a unidirectional rotation of the handle.

FIG. 2 is a close-up view of circle 2 of FIG. 1. Note that the means of coupling the components is by way of a slide-able ball bearing coupling means which is well known in the art. The collar is slid back, which relieves pressure on the ball bearings contained therein. This allows the ball bearings to retreat into the housing, and disengage from the recess in the collar of the tool. Such use is common, and well known, in the art.

FIG. 3 is another embodiment showing a different way of attaching the attachment tool with the handle. Note that there is a chuck, or collet which rotates to grip the engagement tool.

FIG. 4 is an engagement tool, showing the point and gaff arrangement.

FIG. 5 is an engagement tool, showing the hook, or gaff, configuration.

FIG. 6 is an arrow point configuration of an engagement tool.

FIG. 7 is a close-up of circle 7 of FIG. 6. Note the movable barbs (spring loaded) which allow the point to penetrate a filter cartridge and hold it fast for removal.

FIG. 8 is the preferred embodiment of the handle, which shows the handle being comprised of several components, couple-able to form a telescoping handle. For simplicity, only a two part handle is shown in FIG. 8, however, one skilled in the art would recognize that there may be more than two segments that telescope into one another to form a collapsible handle.

FIG. 9 is a close-up of circle 9 of FIG. 8. This demonstrates a rotate-able compression collar, as is commonly used for telescoping shafts.

FIG. 10 is a close-up of a detent configuration. Note the spring-loaded engage beads within the shaft with the smaller diameter. The beads are depressed and the beads disengage from the apertures, which then allows the two shafts to be separated. Such configuration is well known, and commonly available in the art.

FIG. 11 is a demonstration of the lights, along with batter and switch employed in a handle. The batteries are within a battery case, formed within the handle. In this embodiment the lights are located near the working end of the handle. The wires, in a telescoping configuration, are coiled to allow the collapsing and extending of the working handle, while maintaining electrical continuity.

FIG. 14 is a view showing the first filter with hooks attached, pushing the following filters out of the filter track.

FIG. 15 is a view showing the hook system of FIG. 14 with the filter elements removed. Note the hook is free.

FIG. 16 is a side elevational view of the handle with a centrally located grip area.

FIG. 17 is a side elevational view of the handle with a hand grip in the shape of a loop.

FIG. 18 is a view of the handle with a light component enclosed within the handle. The battery compartment and switch is visible in phantom.

FIG. 19 is a view of the handle with a hook configured working end.

FIG. 20 is a view of the handle with the hook end having a removable point.

FIG. 21 is a view of the handle wherein the working end has a triple pointed configuration, in the general form of a trident.

Figure 12:
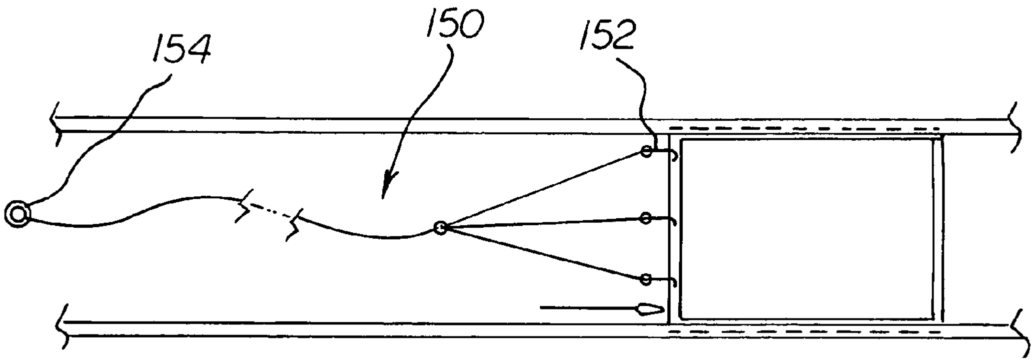
FIG. 12 is a side elevational view of a pull cable system, having hooks and a magnetic ring.
Figure 13:
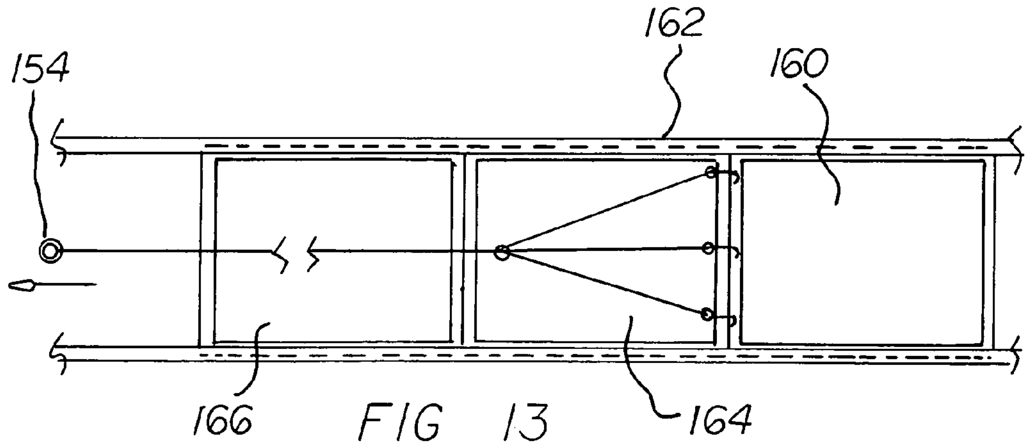
FIG. 13 is a side elevational view of the pull cable of FIG. 12, in which there are multiple filter elements. The first inserted filter is hooked, and the later elements are pushed in. To remove the filter elements, the cable is pulled, and the first in element pushes the other elements out. Note the magnet on the opposite end of the hooks. The magnet allows the pulling cable to be coupled to the inside of the duct, so as not to be come lost, or misplaced.
Figure 22:
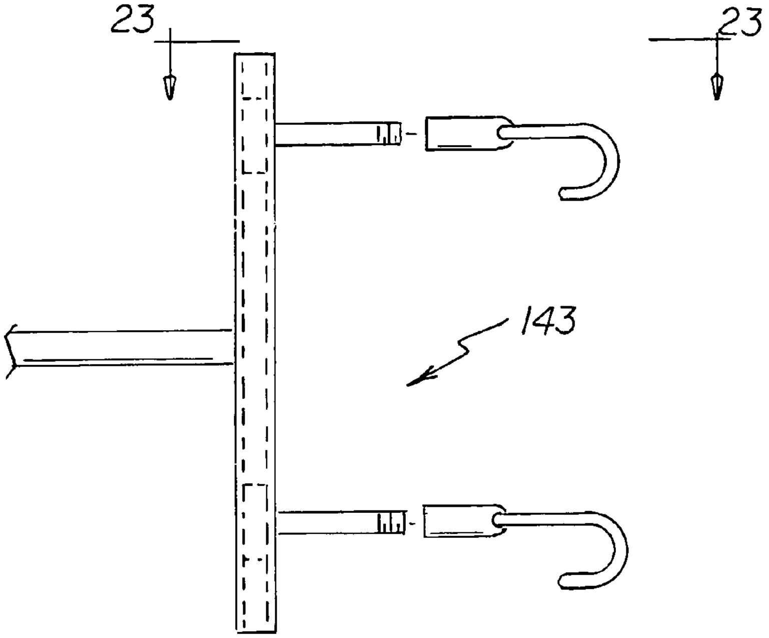
FIG. 22 is a view of the working end of the handle, with the attachment comprising a plurality of removable hooks.
Figure 23:
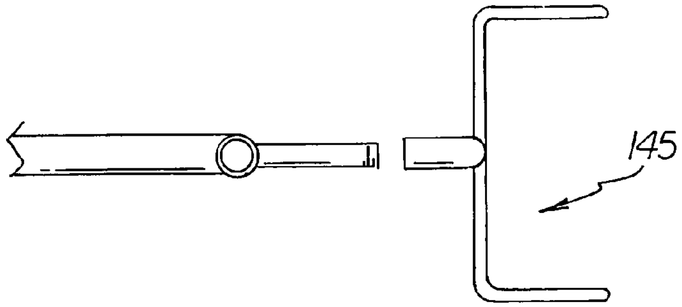
FIG. 23 is a view taken along line 23-23 of FIG. 23.
Figure 24:
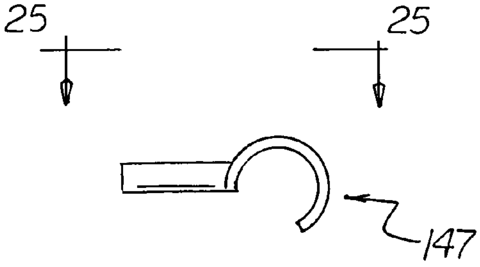
FIG. 24 is a view of a working end which may be attached to the handle. The working end has a generally C-shaped configuration.
Figure 25:
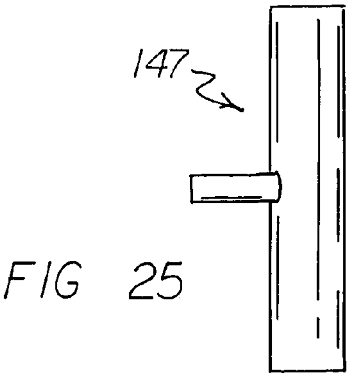
FIG. 25 is a view taken along line 25-25 of FIG. 24.
Figure 26:
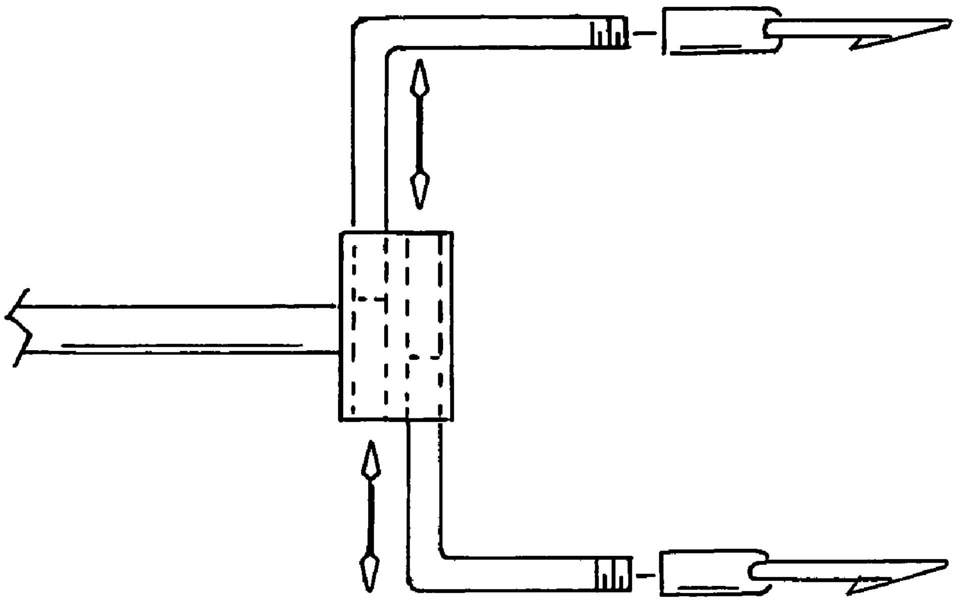
FIG. 26 is a view of the working end, which has the configuration of a pair of slidable ends, which can be opened or closed to form a wider or narrower set of locations for attachment. The tips of the working end are, in this embodiment, removable, though in other embodiments the tips may be fixed, and part of the working end.

Note the cable pulley arrangement of another embodiment. Note that the hook attachment is in the first placed filter. As the cable is pulled back the cable moves through the pulley system, and in doing so, pushes the following filters out of the track, allowing the user to change relatively inaccessible filters with ease.

FIG. 16 is a side elevational view of the pulley system, with the hook being attached to the cable. As the cable is moved, so is the hook moved, and the filter may be inserted or removed by pulling on the cable in one direction or the other.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved an air conditioning filter replacement system embodying the principles and concepts of the present invention and generally designated by the reference numeral 10 will be described.

The present invention, an air conditioning filter replacement system 10, is comprised of a plurality of components. Such components in their broadest context include a handle, a filter engagement tool and a means to couple the handle to the filter engagement tool. Such components are individually configured and correlated with respect to each other so as to attain the desired objective.

First provided is a handle 12. In the preferred embodiment the handle is fabricated of a rigid dielectric material and is configured to telescope. One skilled in the art would recognize, however, that the handle may be made of any natural or synthetic material. It is preferred that the handle not be electrically conductive so as to minimize the risk of electrical current transmission and resulting shock to a user. However, in other embodiments, conductive materials, such as aluminum or steel, may also be used to construct the tool herein described.

The handle has a hollow tubular configuration so as to minimize weight. The segments of the handle each have a hollow tubular configuration. The first handle segment 1, the second handle segment 2, the third handle segment 3, and the fourth handle segment 4 each have a respective first, second, third, and fourth internal diameter. The segments each have a first, second, third, and fourth respective external diameter. The first internal diameter being larger than the second internal diameter, the second internal diameter being larger than the third internal diameter, and the third internal diameter being larger than the fourth internal diameter.

In another embodiment, the handle may be a single component. In another embodiment, the handle may have two components which telescope, one upon the other.

The first external diameter being the largest. The fourth external diameter is smaller than the third internal diameter so as to allow the storage of the fourth segment within the third internal diameter. The third external diameter is smaller than the second internal diameter so as to allow the storage of the third segment within the second internal diameter. The second external diameter is smaller than the first internal diameter so as to allow the storage of the second segment within the first internal diameter.

In other embodiments solid configurations of the handle may be used. Such solid configuration would be of light weight material, such as wood, though any light weight material may be used.

The handle has a gripping end 14 and a working end 16 with a length there between. The gripping end has a hand grip 18. In the preferred embodiment the hand grip and the handle are each fabricated of a dielectric material, though any material may be used in other embodiments.

In the handle having two components which telescope, the first component has the gripping end and the second component has the working end.

In other embodiments, the handle may have grip configurations, such as a sleeve-like 22 grip or looped 24 grip. A combination of grips may also be used.

The handle may be a solid construct, or a hollow tubular construct.

In the preferred embodiment, the gripping end of the handle has a hanging loop 44. The hanging loop allows the handle to be conveniently stored when not in use. The working end of the handle has a pair of detent apertures 46, though in any embodiment the working end may have any one of a number of coupling means, such as a detent and pin configuration, thread and threaded receiver configuration, sleeve and ball bearing configuration, luer locking thread configuration, snap configurations, clip configuration, and collet configuration.

The handle has an illumination component 50 comprising a switch 52, a battery 54, a light 56, and a plurality of wires 58. The wires electronically couple the switch, the battery, and the light. The light is coupled to the shaft of the handle, adjacent the working end. The lights are directed toward the working end so as to provide illumination at the working end. The light may be a bulb or an LED, or a combination thereof. The battery has an associated battery case 60. The battery case is located adjacent the gripping end of the handle. The switch is located at the gripping end of the handle. The wires pass through the handle passageway. To accommodate disassembly of the handle components, the wires may have a keyed connection plug, so as to only allow one way of plugging the wires together. This keyed connection plug is known in the art, and not shown. Generally, however, the wires within the passageway are a light gauge and allow for the telescoping of the components of the handle.

In other embodiments, the battery case may comprise a recess within the handle in which the battery is carried. In the primary embodiment, the battery is located within the handle. In other embodiments, there is a spare battery carrying container located within the handle for carrying spare batteries.

The system may be used in areas with minimal light, such as air-conditioner filter housings, and other dark locations. The light may be either bulb or a Light Emitting Diode (LED). The battery may be either a commonly available storage battery or a rechargeable battery.

In another embodiment, there is no light or battery on the tool handle.

In another embodiment, there is a flashlight 67 having an associated removable mounting bracket 69 which removably clamps on to the shaft of the handle, near the working end. This allows the use to clamp a flashlight on to the shaft, for working in areas without sufficient lighting. The clamp allows the flashlight to be removed easily.

Lastly provided in all embodiments is a filter engagement tool 72. In the preferred embodiment the filter engagement tool is fabricated of a rigid dielectric material, though, in other embodiments, any rigid material may be used. The tool has a handle mounting end 74 and a filter engagement end 76, with a length there between.

The handle mounting end of the engagement tool is configured as a tubular shaft having a fifth external diameter. The fifth external diameter is smaller than the fourth internal diameter. This allows the handle mounting end of the filter engagement tool to slip into and be coupled with the working end of the handle. The handle mounting end has a pair of detents 78. The handle mounting end is configured to slideably couple with the working end of the handle and to be held in place with the detents.

In the preferred embodiment, the handle and handle mounting end of the engagement tool have a generally rounded configuration, though on skilled in the art would recognize that these shafts could be configured in any geometric shape, such as a square shape, a rectangular shape, or a triangular shape, so as to be coupled to one another.

While the detent couples the preferred embodiment filter engagement tool, in other embodiments, other types of coupling means may be used. The coupling means include screw and thread, with or without a locking pin. The locking pin prevents the thread from turning once the tool is in place. This allows the user to rotate the shaft without the filter engagement tool from becoming unattached to the shaft. The pin arrangement may be a simple cotter pin, having a cotter pin hole within the thread and within the shaft working end.

Because the engagement tool may be removed from the handle, a number of configurations for engagement tools are possible. Such alterations constitute various embodiments of the air conditioning filter removal system and may provide a variety of functions, in addition to removing air conditioning filters.

The engagement tools, in such embodiments, may be fixed or removable. In these simpler embodiments, the tool may comprise a shaft that is comprised of various parts, so as to be capable of being disassembled and carried in a convenient manner. In this disassemble-able configuration, the handle may have components that are threaded together or held together by some attachment means, such as detents, treads, clips, snaps, lugs, rotate-able coupling or press fit. Likewise the engagement tool may also be coupled to the shaft with similar means, as listed above.

In the preferred embodiment the filter engagement tool has pointed, spear like configuration 120 with a threaded pointed portion 125. In this configuration the filter would be contacted by the point of the engagement tool, with the point of the tool then being pushed into the filter container, which is usually made of a soft material, such as paper or cardboard. The tool is then turned so that the filter becomes threadedly engaged with and coupled to, the engagement tool.

In a variation of this embodiment, the handle may have an associated bi-directional turning ratchet assembly 133 so that the gripping end of the handle may be held, with the working end of the handle being turned. In this configuration a collet 140 is used to secure the engagement tool to the handle.

In another embodiment the filter engagement tool may have an offset shaft 122 with a blunted tip 124.

In still another embodiment the filter engagement tool may have a hook configuration 126, or a pointed gaff configuration 128.

In yet another embodiment the filter engagement tool may have an arrow head configuration 130 with movable barbs 132. One skilled in the art would also recognize that a pointed tip with a fixed barb would be amenable to a point-and-barb configuration as described above.

The filter engagement tool may take on many forms, such as hooks, loops, clips, clamps, adhesives, or a suction cup, depending on the application. The means of attaching the filter engagement tool to the handle may be by way of collet and shaft 140 or engaging and disengaging ball bearings 142, as is commonly used in slide-able or rotate-able quick disconnects. The obvious configurations such as those using threaded male and female components is not shown, but are well known in the art.

In another embodiment, the working end of the handle may have a plurality of engagement devices associated there with, such as a trident configuration 141, which would allow the impalement of an air conditioning filter along the edge, instead of at a single point, making more contact for pulling and removal. The multiple configuration may also have a multiple hooked configuration 143, or a multiple prod configuration 145.

Lastly, the engagement means may have a curved planar configuration, much like a partially tubular configuration 147.

In the most simplistic form, the air conditioning filter removal tool may comprise a cable 150 with at least on hook 152. A magnet 154 is attached to the cable. In this configuration the hook is attached to the first filter element 160 to be placed in a filter track 162. As the second 164 and third 166 filters are slid into the filter track the filter pulls the cable along. The magnet is used to couple the cable to the metal duct-work, so that when it is time to change the filters, the duct is opened, and the magnet and attached cable is retrieved. The cable is then pulled, which urges the latter placed filters out of the track, being pushed by the first filter which is attached by the hook or hooks.

In another embodiment of this cable configuration, the cable may be continuous 170, and contained within pulleys 172. There is a single hook 174 attached to the first placed filter. The cable is played back and forth as the filters are removed and then replaced with new filters (See FIGS. 15 and 16).

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An air conditioning filter removal system comprising:

a handle having a gripping end and a working end with a length there between;

a filter engagement tool with the filter engagement tool being coupled to the handle, the filter engagement tool having a filter engagement means;

the handle having a plurality of segments, being a first segment and a second segment, with the first segment having a first internal diameter and a first external diameter and the second segment having a second internal diameter and a second external diameter, with the second external diameter being less than the first internal diameter so as to allow telescoping of the second segment into the first segment;

the filter engagement tool having a threadedly pointed end for engaging a filter and a coupling means for attaching the engagement tool to the handle; and an electrical circuit comprising a battery and at least one light and a switch, with at least one wire coupling the battery and the light and the switch, with the light being located adjacent the working end of the handle and the switch being located adjacent the gripping end of the handle.

2. The air conditioning filter removal system as described in claim 1 wherein the system further comprises a flashlight and a flashlight clamp, the flashlight comprising a battery and at least one light and a switch, with at least one wire coupling the battery and the light and the switch, the flashlight clamp being configured to removably clamp the flashlight to the working end of the handle.

3. The air conditioning filter removal system as described in claim 1 with the system further comprising:

the handle having an illumination component comprising a switch and a battery and a light and a plurality of wires coupling the switch and battery and light, the light being coupled to the shaft of the handle adjacent the working end, the lights being directed toward the working end so as to provide illumination, the battery having an associated battery case and being located adjacent the gripping end of the handle, with the switch being located at the gripping end of the handle.

4. The air conditioning filter removal system as described in claim 1 wherein the system further comprises the handle having a battery recess for storing spare batteries.

* * * * *